United States Patent [19]
Collepardi

[11] 4,088,504
[45] May 9, 1978

[54] METHOD OF PRODUCING HIGH STRENGTH CEMENT CONGLOMERATES

[75] Inventor: Mario Collepardi, Rome, Italy

[73] Assignee: Emesa Aktiengesellschaft, Eschen, Liechtenstein

[21] Appl. No.: 695,114

[22] Filed: Jun. 11, 1976

[30] Foreign Application Priority Data

Jun. 13, 1975   Italy .................. 84134 A/75

[51] Int. Cl.$^2$ ................................. C04B 7/02
[52] U.S. Cl. .......................... 106/90; 106/92; 106/104; 106/109; 106/110; 106/111; 106/114; 260/9; 260/17.4 ST
[58] Field of Search ............ 106/89, 90, 92, 104, 106/111, 114, 109, 110; 260/9, 17.4 ST

[56] References Cited
U.S. PATENT DOCUMENTS

| | | | |
|---|---|---|---|
| B 465,955 | 2/1976 | Schaupp ............................. | 106/90 |
| 2,358,730 | 9/1944 | Nelson et al. ...................... | 106/114 |
| 2,662,024 | 12/1953 | Riddell et al. ..................... | 106/114 |
| 3,272,765 | 9/1966 | Sefton ................................ | 106/111 |
| 3,520,708 | 7/1970 | Chambers et al. ................. | 106/111 |
| 3,802,894 | 4/1974 | Prost et al. ........................ | 106/104 |

*Primary Examiner*—Winston A. Douglas
*Assistant Examiner*—John P. Sheehan

[57] ABSTRACT

A method for producing high strength cement conglomerates is disclosed. Cement conglomerates (pastes, mortars, concretes and the like) having improved mechanical characteristics, are produced in accordance with the invention by adding to a mix of water, binder and aggregates a admixture or composition containing: (1) a polymer obtained by polycondensation of an aldehyde with a water-soluble sulphonic acid of the aromatic series, and (2) a product of the hydrolysis of starch obtained from raw vegetable materials such as maize, wheat, rice, potatoes, etc. Water soluble inorganic electrolytes may advantageously be added to the admixture for significantly improving the characteristics of fluidity and cohesion of the fresh mix, and the characteristics of strength of the hardened mix.

22 Claims, No Drawings

METHOD OF PRODUCING HIGH STRENGTH CEMENT CONGLOMERATES

The present invention relates to a method for producing high strength cement conglomerates, such pastes, mortars, concretes and the like.

As known in the art, the mechanical strength R of a concrete and the ratio by weight (w/c) of the water to the cement present in the mix are related by the formula:

$$R = \frac{K_1}{K_2^{w/c}} \quad \text{(Abrams' law)}$$

wherein $K_1$ and $K_2$ are constants which depend on the type of inert and binder, the inert/binder ratio, the temperature and the curing time.

It is also known in the art to introduce admixture into mixes of inorganic binders which render the mix more fluid and thus reduce the quantity of mixing water, so increasing the mechanical strength of the concrete obtained.

In accordance with the present invention, cement conglomerates (pastes, mortars, concretes and the like) which, in comparison with known conglomerates, have improved mechanical characteristics, are produced by adding to a mix of water, binder and aggregates an admixture or composition containing:

a polymer obtained by polycondensation of an aldehyde with a sulphonic acid of the free or salified aromatic series, soluble in water, and a product of the hydrolysis of starch obtained from any raw vegetable material such as maize, wheat, rice, potatoes, etc.-

Water soluble inorganic electrolytes may advantageously be added to the admixture for significantly improving the characteristics of fluidity and cohesion of the fresh mix, and the characteristics of strength of the hardened mix.

The unique admixture of the invention may also be advantageously added to the cementitious mix in a dosage rate of from between about 0.01 and 3%, and preferably of from between about 0.1 and 1% by weight on the binder weight.

The following specific examples will serve to further demonstrate the invention but are not intended to limit it thereto.

As stated above the method of the invention comprises adding to the mix of water, binder and aggregates an admixture comprising:

a polymer obtained by polycondensation of an aldehyde with a sulphonic acid of the aromatic series, free or salified, soluble in water (component No. 1), a product of the hydrolysis of starch obtained from any raw vegetable material such as maize, wheat, rice, potatoes, etc. (component No. 2).

Component No. 1: preferably consists of the polycondensate of formaldehyde with sodium naphthalenesulphonate of type α or type β, or with a mixture of the two.- It may be represented by the formula

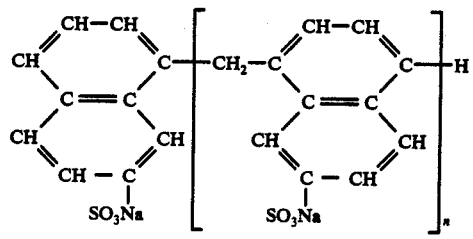

where n = 1, 2, 3, ... Component No. 2: consists of a polyglucosaccharide prepared by acid, thermal or enzymatic hydrolysis of the starch obtained from any raw vegetable material such a maize, wheat, rice, potatoes, etc., and containing preferably polysaccharides with a degree of polymerisation between 3 and 7 units of glucose. In particular, commercially available hydrolysed starches may be use, consisting of 30% by weight of polysaccharides containing 3 to 7 units of glucose.

The components No. 1 and No. 2 may be present in the admixture within a wide range of composition, as in the following composition by weight:
  component No. 1: 5.0 to 99.9%, preferably 40 to 95%
  component No. 2: 0.1 to 95.0%, preferably 5 to 60%

The admixture so obtained may be added to the cement mix in an amount of from between about 0.01% to 3%, preferably from about 0.1% to 1.0% of the weight of the binder, which may be Portland cement with or without pozzolana, fly ash, ground quartz, blast furnace slag, aluminous cement, gypsum or other inorganic binder.

The cementitious mix or the invention may be used to prepare self-levelling concretes, i.e. concretes of high fluidity (20–25 cm of slump), with a very low water/binder ratio, with a loss of workability versus time negligible and with an unusual high strength as composed to concrete prepared with a single component, and surprising higher as compared to concrete without the admixture.

The components Nos. 1, 2 and 3 may be present in the mixture within a wide range of composition, as in the following composition by weight:
  component No. 1: 5.0 to 99%, preferably 30 to 90%
  component No. 2: 0.1 to 65%, preferably 1 to 10%
  component No. 3: 0.1 to 65%, preferably 5 to 40%.

In cases wherein particular characteristics of the mechanical strength of the hardened mix is important, an inorganic electrolyte, soluble in water, of alkali metals and/or ammonium may be added to the admixture of component No. 1 and No. 2. This electrolyte (Component No. 3) preferably comprises a carbonate, bicarbonate, chloride, sulphate, <u>nitrate</u>, <u>nitrite</u>, phosphate, pyrophosphate, metaphosphate, polyphosphate, borate, or hydroxide of alkali metal, preferably of sodium, or of ammonium, or a mixture of these.

The following examples will strikingly illustrate how the use of the mixture of component No. 1 and No. 2, No. 2 and No. 3 permits one to obtain, at constant workability of the fresh mix, performances unusually high compared to performances achievable with the single components alone and surprisingly higher compared to concrete without mixture.

EXAMPLE 1

TABLE 1

Strengths of concretes according to the example 1.

| Component No. 1 (%) | Component No. 2 (%) | Admixture Cement (%) | Water/Cement | Slump (cm) ± 0,5 | Compressive strength (Kg/cm$^2$) 3d | 7d | 28d |
|---|---|---|---|---|---|---|---|
| 100 | 0 | 0.386 | 0.425 | 22 | 332 | 454 | 630 |
| 90 | 10 | 0.386 | 0.415 | 22 | 364 | 514 | 690 |
| 80 | 20 | 0.386 | 0.420 | 22 | 332 | 495 | 740 |
| 70 | 30 | 0.386 | 0.420 | 22 | 329 | 535 | 785 |
| 60 | 40 | 0.386 | 0.425 | 22 | 257 | 502 | 810 |
| 0 | 100 | 0.386 | 0.437 | 22 | 12 | 414 | 580 |
| 100 | 0 | 0.579 | 0.360 | 22 | 456 | 591 | 780 |
| 90 | 10 | 0.579 | 0.360 | 22 | 423 | 626 | 826 |
| 80 | 20 | 0.579 | 0.350 | 22 | 369 | 636 | 835 |
| 70 | 30 | 0.579 | 0.360 | 22 | 243 | 632 | 884 |
| 60 | 40 | 0.579 | 0.360 | 22 | 159 | 635 | 920 |
| 0 | 100 | 0.579 | 0.420 | 22 | 5 | 33 | 120 |
| 0 | 0 | 0 | 0.560 | 22 | 193 | 275 | 383 |

Component No. 1:
polycondensate of the sodium salt of β-naphthalenesulphonic acid ($C_{10}H_7 \cdot SO_3Na$) with formaldehyde ($CH_2O$).
Component No. 2:
hydrolysed starch syrup containing 40% of polysaccharides with 3–7 units of glucose.

The following materials were mixed:

| | |
|---|---|
| sand | 23.350 kg |
| gravel (maximum diameter 12,7mm) | 23.350 kg |
| high strengths Portland cement according to Italian standard | 10.000 kg |

To the mix of solids so obtained was added, in various percentages, the companents No. 1 and No. 2 and then a quantity of water sufficient to get a constant workability equal to 22 ± 0.5 cm of slump. With the mixes were prepared cubic test specimens (10×10×10 cm), which were then cured at 20° C with a relative humidity 65%.

On the cubic test specimens prepared with different mixes, cured at 3,7 and 28 days were tested the strengths which are reported in table 1.

The data of table 1 show the synergistic effect of the mixture of the components No. 1 and No. 2, all according to the invention, which allow to achieve at 7 days and above all at 28 days, at constant workability, strengths not otherwise achievable with component No. 1 or No. 2 alone.

EXAMPLE 2

The purpose of the example is to show the increased fluidising effect of the admixture according to the invention, in which to the components No. 1 and No. 2 of the example 1 was added a component No. 3, and precisely sodium carbonate. The evolution of the fluidising power of the mixture of components was made by measuring the spread on a drap table (UNI Standard) of a mortar prepared in accordance with Italian laws relating to hydraulic binders (G.U. No. 180 of 17.7.1968, D.M. of 3.6.1968, art. 10), i.e. containing 450 g of cement, 225 g of water and 1350 g of Torre del Lago sand.

TABLE 2

Fluidity of cement mortars evaluated by their spread

| Component N. 1 (%) | Component N. 2 (%) | Component N. 3 (%) | Admixture cement (%) | Spread (mm) |
|---|---|---|---|---|
| — | — | — | 0.0 | 90 |
| 100 | — | — | 0.3 | 145 |
| 70 | 20 | 10 | 0.3 | 165 |
| 100 | — | — | 0.6 | 170 |
| 70 | 20 | 10 | 0.6 | >200 |

Component No. 1:
polycondensate of the sodium salt of β-naphthalenesulphonic acid ($C_{10}H_7 \cdot SO_3Na$) with formaldehyde ($CH_2O$)
Component No. 2:
hydrolysed starch syrup containing 40% of polysaccharides with 3–7 units of glucose
Component No. 3:
sodium carbonate ($Na_2CO_3$)

Table 2 shows the results obtained with a Portland 425 cement. The first three columns show the percentage compositions of the components No. 1, No. 2 and No. 3 of the mixture. The fourth column shows the amount of admixture added as a percentage of the cement weight, and the fifth column shows the flow of the mortar.

The results show the fluidising effect of the admixture according to the invention. In particular, the flow increases by more than 80% (with 0.3 of admixture) and by more than 120%(with 0.6% of admixture) with respect to the mix without admixture. The results obtained also show that the admixture according to the invention possesses a fluidising power greater than that of the polycondensate of the sodium salt of β-naphthalenesulphonic acid with formaldehyde.

EXAMPLE 3

The example shows the synergistic effect of the admixture according to the invention, especially if the component No. 3 is sodium chloride. Components No. 1 and No. 2 are those described in example 1. The percentage of each component by weight of cement are indicated in Table 3.

Strengths of concretes prepared according to the example 3

| Admix. No. | Comp. No. 1 (%) | Comp. No. 2 (%) | Comp. No. 3 (%) | Water/Cement | Slump (cm) | Compressive strength (Kg/cm$^2$) 1d | 7d | 28d |
|---|---|---|---|---|---|---|---|---|
| 1 | — | — | — | 0.46 | 10.5 | 61(0) | 305(0) | 453(0) |
| 2 | — | — | 0.300 | 0.51 | 21.0 | 75(23) | 305(0) | 419(−8) |
| 3 | — | 0.015 | — | 0.50 | 21.0 | 65(6) | 318(4) | 403(−11) |
| 4 | 0.400 | — | — | 0.37 | 21.0 | 105(72) | 472(55) | 634(40) |
| 5 | — | 0.015 | 0.300 | 0.51 | 20.5 | 69(13) | 326(7) | 432(−5) |
| 6 | 0.400 | — | 0.300 | 0.36 | 21.5 | 130(113) | 528(73) | 630(39) |

-continued

| | | Strengths of concretes prepared according to the example 3 | | | | | | |
|---|---|---|---|---|---|---|---|---|
| Admix. No. | Comp. No. 1 (%) | Comp. No. 2 (%) | Comp. No. 3 (%) | Water/ Cement | Slump (cm) | Compressive strength (Kg/cm$^2$) | | |
| | | | | | | 1d | 7d | 28d |
| 7 | 0.400 | 0.015 | — | 0.36 | 21.5 | 126(106) | 534(75) | 673(48) |
| 8 | 0.400 | 0.015 | 0.300 | 0.36 | 21.0 | 147(141) | 558(83) | 722(66) |

Component No. 1:
polycondensate of the sodium salt of β-naphthalenesulphonic acid ($C_{10}H_7 \cdot SO_3Na$) with formaldehyde ($CH_2O$).
Component No. 2:
hydrolysed starch syrup containing 40% of polysaccharides with 3–7 units of glucose.
Component No. 3:
sodium chloride (NaCl).

In all the concretes containing the admixtures, the amount of water was such that very flowable concretes with a slump of 21 cm were obtained. Only the concrete without mixture was prepared with a slump of about 10 cm, in order to make evident both the advantages of the present invention: higher flowability in the flowability in the in the fresh state and greater strength in the hardened state.

Table 3 shows the strength of concretes at 1 - 7 - 28 days: the values in brackets show the increase of the strength with respect to that of the concrete without admixture.

These values show the synergistic effect of the binary admixture No. 7 and of the ternary admixture No. 8, both prepared according to this invention. In fact the increases of strength that can be obtained with these admixture are greater than the results obtained by adding together the increases of each component.

EXAMPLE 4

The purpose of this example is to show the fluidising effect of the admixture according to the invention on fresh concrete.

The following materials were mixed together:

| | |
|---|---|
| sand (maximum diameter 5 mm) | 55.00 Kg |
| gravel (maximum diameter 50 mm) | 82.50 Kg |
| ordinary Portland cement (type 325 Kg/cm$^2$) | 26.25 Kg |

The particle size distribution of the inerts used is shown in table 4.

Water (12.5 litres) was added to the mixture to prepare a concrete having a workability equal to 5 cm of slump after mixing for 3 minutes. The admixture having the composition indicated in table 1 was added to the concrete prepared in this manner.

TABLE 4

| Particle size distribution of inerts | | | | |
|---|---|---|---|---|
| | DIAMETER (mm) | 0÷0.3 | 0.3÷1.2 | 1.2÷2.5 | 2.5÷5 |
| Sand | % | 27 | 32 | 16 | 25 |
| | DIAMETER (mm) | 5÷10 | 10÷15 | 15÷30 | — |
| Gravel | % | 17 | 35 | 48 | — |

The amount of admixture was 0.6% of the cement weight. After mixing for a further 2 minutes, the concrete had a workability equal to 23 cm of slump. It was cast into moulds of 10×10×10 cm in order to make up test pieces for curing at 20° C under a relative humidity of 65%. In preparing the test pieces, no compacting was necessary because of the high fluidity of the concrete.

A second concrete without admixture and containing sand, gravel and cement in the proportions given herefore was also prepared.

The addition of water (16 litres) was regulated in such a manner as to obtain a concrete having a workability less than the comprising the admixture (slump: 12 cm). Test pieces of 10×10×10 cm, compacted manually with a rammer, were prepared an cured at 20° C under a relative humidity of 65%.

Mechanical strength tests were carried out on the test pieces obtained from both the concretes and cured for 1, 3, 7 and 28 days, the results being given in table 5.

TABLE 5

| Characteristics of concretes with and without the admixture according to the invention | | | | | | |
|---|---|---|---|---|---|---|
| | water/ cement | Slump (cm) | Compressive strength (Kg/cm$^2$) | | | |
| | | | 1 day | 3 days | 7 days | 28 days |
| Concrete with admixture | 0.48 | 23 | 140 | 335 | 451 | 565 |
| Concrete without admixture | 0.61 | 12 | 83 | 178 | 282 | 386 |
| Concrete without admixture | 0.48 | 5 | 106 | 208 | 315 | 432 |

The results of table 5 show that by adding the mixture according to the invention, both the workability and mechanical strength of the concrete may be improved simultaneously. In particular, concretes containing admixtures may be prepared which, although being self-levelling (slump: 23cm), offer a mechanical strength considerably greater than that of less workable concrete without admixture (slump: 12cm).

Furthermore, a comparison of concretes prepared with the same water/cement ratio shows that the concrete with the admixture according to the invention offers greater mechanical strength. This indicates that the increase in mechanical strength obtainable by adding the admixture according to the invention is due not only to the reduction in water/cement ratio, as might be deduced from Abrams' law, but is also due to the greater degree of hydration of the cement.

EXAMPLE 5

The example shows as an admixture prepared according to the invention, and containing the components No. 1 and No. 2 (described in example 1) and sodium chloride as component No. 3, can be advantageously used also for the steam curing of concretes, particularly without a preliminary curing at room temperature.

Three concretes with the same workability (slump = 20cm) and a cement content of 400 Kg/m$^3$ were prepared. All the concretes were prepared with the same high strength cement, sand and aggregates, but with a different water/cement ratio (indicate in table 6) in order to obtain the same workability. The first concrete was prepared without admixture; the second one contained only the component No. 1 (0.60% by weight of cement); in the third concrete an admixture (0.60% by weight of cement) prepared according to the invention was present: the composition of this admixture is shown in table 6.

The fresh concretes immediately after mixing were cast into moulds of 10×10×10 cm and the test specimens obtained were heated so that the temperature was risen in three hours from 20° C to 70° C. After a steam treatment of three hours at 70° C the concretes were cooled for one hour at room temperature and then compressive strength was measured. Some other test pieces of the same concretes were maintained at room temperature after the above mentioned steam curing and the strength at 7 days was determined.

TABLE 6

Strength of concretes steam cured without preliminary curing at room temperature

| Component No. 1 (%) | Component No. 2 (%) | Component No. 3 (%) | Admixture Cement (%) | Water/ Cement | Slump (cm) | Compresive strength (Kg/cm²) 7hours | 7days |
|---|---|---|---|---|---|---|---|
| 0 | 0 | 0 | 0.00 | 0.55 | 20 | 143 | 362 |
| 100 | 0 | 0 | 0.60 | 0.40 | 20 | 178 | 640 |
| 60 | 3 | 37 | 0.60 | 0.37 | 20 | 390 | 702 |

Component No. 1 as in example 1
Component No. 2 as in example 1
Component No. 3 sodium chloride (NaCl)

The results shown in table 6 indicate that the advantages consist in a faster development of the strength at the early curing (after 7 hours of steam treatment) and at the same time in a higher strength at the later curing (after 7 days).

EXAMPLE 6

Concretes were prepared with and without the admixture, having a content of high resistance Portland cement (425 Kg/cm²) of 400 Kg/m³, and using sand and gravel of the type described in the example 4, the sand content being 38% of all the inerts.

The water/cement ratio in the concretes was fixed to give a slump of 9.0 ± 1.0 cm. The admixture used was that indicated in example 2.

The concrete was then cast into moulds of 10×10×10 cm, to make up test pieces which were subjected to the following steam treatment: 3 hours of precuring at 20° C, 2 hours to raise the temperature from 20° C to 75° C, in the presence of saturated steam, and 1 hour for cooling the test pieces to 25° C. The concretes were fractured by compression after 12 hours, 3 days and 28 days from the beginning of the thermal cycle.

The values of their mechanical strength are given in table 7.

TABLE 7

Influence of the admixture according to the invention on the mechanical strength of concrete under low pressure steam curing.

| Admixture cement (%) | Water/ cement | Compressive strength (Kg/cm²) 12 hours | 3 days | 7 days | 28 days |
|---|---|---|---|---|---|
| 0.0 | 0.45 | 175 | 291 | 384 | 441 |
| 0.5 | 0.39 | 263 | 402 | 428 | 528 |
| 1.0 | 0.37 | 231 | 390 | 432 | 537 |

These results show that addition of the admixture increases the mechanical strength of concretes cured under steam, after both short and long curing times.

EXAMPLE 7

The purpose of this example is to illustrate the advantages of using sodium sulphate as component No. 2 for concretes cured under steam. To this end, two concretes were prepared, both containing 1% of admixture. In the first admixture, the composition of which is shown in table 1, component No. 3 was sodium carbonate, which is a salt preferably used for curing concretes at ambient temperature, while in the second admixture component No. 3 was sodium sulphate, present in equal quantity. The concretes were prepared and cured as in example 5, and the values of the mechanical strength obtained are given in table 8.

TABLE 8

Influence of the admixtures according to the invention on the mechanical strength of concrete cured under low pressure steam

| | Water/ cement | Compressive strength (Kg/cm²) 12 hours | 3 days | 7 days | 28 days |
|---|---|---|---|---|---|
| 1st Admixture (with Na₂CO₃) | 0.37 | 231 | 390 | 432 | 537 |
| 2nd Admixture (with Na₂SO₄) | 0.37 | 243 | 401 | 446 | 539 |

The results obtained show that for concretes cured under steam, higher mechanical strength is obtained if component No. 3 of the admixture is sodium sulphate.

EXAMPLE 8

The purpose of this example is to demonstrate the influence of the admixture according to the invention on the mechanical strength of autoclaved concretes. To this end concretes were prepared containing 500 Kg/m³ of high mechanical strength Portland cement (425 Kg/cm²), using the inerts described in example 4 and the admixture having the composition shown in table 2.

Test pieces of 10×10×10 cm were prepared from these concretes and subjected to the following thermal cycle: 3 hours of precuring at 20° C, 4 hours to raise their temperature from 20° C to 190° C, 3 hours at 190° C in a saturated steam environment, and 3 hours of cooling from 190° C to 25° C. After 12 hours from the beginning of mixing, the test pieces were fractured by compression and gave the results indicated in table 9.

TABLE 9

Influence of the admixture according to the invention on the mechanical strength of autoclaved concrete

| Admixture/cement (%) | Compressive strength (Kg/cm²) |
|---|---|
| 0 | 655 |
| 0.5 | 906 |

TABLE 9-continued

Influence of the admixture according to the invention on the mechanical strength of autoclaved concrete

| Admixture/cement (%) | Compressive strength (Kg/cm²) |
| --- | --- |
| 1 | 958 |

The results obtained show that the addition of the admixture according to the invention increases the strength of autoclaved concretes. The method of the invention may comprise subjecting the mixture to autoclave treatment under steam at a pressure greater than 1 atm. Curing may also be carried out under low pressure steam, i.e., less than 1 atm.

What is claimed is:

1. A method for producing high strength cement conglomerates comprising adding to a mix of water, inorganic binder and aggregates a mixture containing:
   a polymer obtained by polycondensation of an aldehyde with a sulphonic acid of the aromatic series, free or salified, soluble in water (Component No. 1), and
   a product of the hydrolysis of starch obtained from any raw vegetable material (Component No. 2).

2. The method in accordance with claim 1 wherein the admixture comprises a polymer obtained by polycondensation of formaldehyde with a sulphonic acid of the aromatic series, free or salified, soluble in water.

3. The method in accordance with claim 1 wherein the admixture comprises a polymer obtained by polycondensation of formaldehyde with an acid, free or salified, selected from at least one of the group comprising alkylbenzenesulphonic acids, benzenesulphonic acids.

4. The method in accordance with claim 1 wherein the admixture comprises a polymer obtained by polycondensation of formaldehyde with sodium naphtalene-sulphonate of α or β type.

5. The method in accordance with claim 1 wherein the mixture comprises a polyglucosaccharide prepared by the acidic, thermic or enzymatic hydrolysis of the starch obtained by any vegetable raw material.

6. The method as defined in claim 1 wherein the hydrolized starch contains at least 30% by weight of polymers with a polymerisation degree between 3 and 7.

7. The method as defined in claim 1 wherein the binary mixture has the following composition by weight:
   component No. 1 5 to 99.9%
   component No. 2 0.1 to 95%

8. The method as defined in claim 1, comprising adding as a third component (component No. 3) to the said admixture, a water soluble inorganic electrolyte.

9. The method as defined in claim 8 comprising adding to the admixture an inorganic electrolyte of alkali metals.

10. The method as defined in claim 9 comprising adding to the said admixture, the sodium salt of an acid selected from the group consisting of carbonic acid, nitric acid, nitrous acid, phosphoric acid, metaphosphoric acid, polyphosphoric acid, hydrochloric acid, sulphuric aicd, sulphurous acid, prophosphoric acid or mixtures thereof.

11. The method as defined in claim 8 wherein the said electrolyte is sodium sulfate.

12. The method as defined in claim 1 comprising adding to the said admixture the ammonium salt of an acid selected from the group consisting of carbonic acid, nitric acid, nitrous acid, phosphoric acid, metaphosphoric acid, polyphosphoric, acid, hydrochloric acid, sulphuric acid, sulphurous acid, pyrophosphoric acid or mixtures thereof.

13. The method as defined in claim 8 wherein said electrolyte is an alkali hydroxide.

14. The method as defined in claim 4 wherein said hydroxide is sodium hydroxide.

15. The method as defined in claim 8 wherein said electrolyte is ammonium hydroxide.

16. The method as defined in claim 8 wherein the ternary mixture has the following composition by weight:
   component No. 1: 5 to 99.8%
   component No. 2: 0.1 to 65%
   component No. 3: 0.1 to 65%

17. The method as defined in claim 1 comprising adding the admixture into the mix to the extent of from about 0.01 to 3% of the binder weight.

18. The method as defined in claim 1 comprising curing the admixture under low pressure steam (< 1 atm).

19. The method as claimed in claim 1 comprising subjecting the admixture to autoclave treatment under steam at a pressure greater than 1 atm.

20. The method as defined in claim 7 wherein the binary admixture has the following composition by weight:
   component No. 1: 40 to 95%
   component No. 2: 5 to 60%

21. The mehod as defined in claim 16 wherein the ternary admixture has the following composition by weight:
   component No. 1: 30 to 90%
   component No. 2: 1 to 10%
   component No. 3: 5 to 40%

22. The method as defined in claim 17 comprising adding the admixture into the mix to the extent of from about 0.1 to 1% of the binder weight.

* * * * *